United States Patent
Auerbach et al.

(10) Patent No.: US 7,009,795 B2
(45) Date of Patent: *Mar. 7, 2006

(54) SYSTEM AND METHOD FOR CORRECTING FOR HEAD TILT IN HDD

(75) Inventors: Daniel Jonathan Auerbach, San Jose, CA (US); Jeffrey Joesph Dobbek, Morgan Hill, CA (US); Gregory Michael Frees, Los Altos, CA (US); David Robison Hall, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 37 days.

This patent is subject to a terminal disclaimer.

(21) Appl. No.: 10/787,668

(22) Filed: Feb. 26, 2004

(65) Prior Publication Data

US 2005/0190481 A1 Sep. 1, 2005

(51) Int. Cl.
*G11B 15/18* (2006.01)
(52) U.S. Cl. .................................................... 360/69
(58) Field of Classification Search ............... 360/69; 710/6
See application file for complete search history.

(56) References Cited

U.S. PATENT DOCUMENTS

| 6,389,508 B1 * | 5/2002 | Tamura ..................... 711/112 |
| 6,496,877 B1 | 12/2002 | Greenberg et al. ............. 710/6 |

* cited by examiner

*Primary Examiner*—David Hudspeth
*Assistant Examiner*—Mitchell Slavitt
(74) *Attorney, Agent, or Firm*—John L. Rogitz

(57) ABSTRACT

Tilt between a head stack and its associated disk stack in a hard disk drive (HDD) is measured by determining the deviation of a target head from its expected position (based on the position of the current head) each time electrical contact is switched from the current head to a target head. A running average tilt value is stored and used to modify the logical seek distance used in a Rotational Position Optimization (RPO) algorithm to better order I/O requests in a queue. Also, the running average tilt value can be used by the servo to pre-position the target head before electrical contact is made with the target head, to improve speed of operation.

17 Claims, 2 Drawing Sheets

SYSTEM AND METHOD FOR CORRECTING FOR HEAD TILT IN HDD

FIELD OF THE INVENTION

The present invention relates to hard disk drives.

BACKGROUND OF THE INVENTION

The performance of a hard disk drive (HDD) is degraded when mechanical tilt exists between the actuator head stack and the disk stack. Such tilting can be caused by a number of factors, including HDD case warping, etc. The performance degradation arises because the mechanical tilt requires additional physical motion of the actuator when a head-switch occurs. This physical motion of the actuator to position the target head on the target track takes a finite amount of time prior to being able to successfully read/write data. As recognized herein, if this additional seek-time due to tilt is not accounted for by the system, the result can be that the target data sector is missed, which then requires a full revolution of the disk to retry the read/write operation. The present invention understands that the extra time required to move the actuator to adjust for the mechanical tilt, and the increased opportunity for missing a revolution because of not accounting for this extra time, results in reduced performance of the disk drive.

As further recognized by the present invention, without foreknowledge of the magnitude of mechanical tilt between the current and target heads, the servo must wait until electrical connection is made on the target head and a valid PES value is "seen" on the disk so that the correct seek (both direction and length) can be made. Thus, the tilt problem precludes the servo from being able to "move early" before the electrical connection is made to the target head. The delay between an "early move" and waiting until electrical connection is made also costs valuable time which degrades I/O performance.

In addition to the above considerations, the present invention, in recognizing that a Rotational Position Optimization (RPO) algorithm can be used to reorder the commands in a HDD controller queue for optimized execution, further recognizes that to make optimal choices for command ordering, the RPO algorithm must be able to accurately estimate the time required to execute each command, and this estimation depends on the seek-length that must be covered in moving the actuator to get the correct place for the next command. If the seek lengths which are used are based on "logical" seek lengths, meaning that the seek length is calculated by determining the target track (based on format calculations) and subtracting the current track, with no correction for any seek length modifications due to mechanical tilt, the estimates will be erroneous. As understood herein, by failing to account for the true "physical" seek length (which is based on the logical seek length plus correction for tilt), incorrect information may be selected from tables that are used to make seek time estimates, or incorrect information will be input to functions that are used to make seek time estimates. Under these conditions, the RPO algorithm's command ordering will not be optimum. The problem is further exacerbated by the fact that the "learning" process for any adaptive RPO algorithm is degraded by inaccurate knowledge of the true physical seek length. The result can be inaccurate sorting of the command queue which ultimately leads to even further degraded I/O performance.

SUMMARY OF THE INVENTION

The present invention implements a code architecture in a hard disk drive (HDD) that measures the mechanical tilt between heads, and then calculates true physical seek lengths (as opposed to logical seek lengths) for use in the RPO queuing calculations. Furthermore, the tilt information can be used by the servo in order to start moving the actuator toward the target track prior to making electrical connection with the target head. Both of these advantages lead to superior performance by making more appropriate choices in the RPO sort, and by reducing short-seek and head-switch times in the servo.

Accordingly, a method for controlling a disk drive having a disk stack and a head stack includes ordering requests in a queue of the disk drive based at least in part on a mechanical tilt between the disk stack and head stack.

Preferably, the method includes moving a target head toward a position on a disk before electrical contact is made with the target head at least in part based on the mechanical tilt. The mechanical tilt may be determined by measuring a position of a current head in electrical contact with a drive controller just prior to an electrical connection of a target head with the controller, and then measuring a position of the target head. A value representative of the mechanical tilt can be based on the difference in position of the target head and the position of the current head, and the values stored in a table.

In another aspect, a method for controlling a disk drive having a disk stack and a head stack includes moving a target head toward a position on a disk before electrical contact is made with the target head at least in part based on a mechanical tilt between the disk stack and head stack.

In yet another aspect, a method for accounting for mechanical tilt between a head stack and a disk stack in a hard disk drive (HDD) that includes a HDD controller includes moving a target head toward a position on a disk before electrical contact is made with the target head at least in part based on a mechanical tilt between the disk stack and head stack. The method also includes ordering requests in a queue of the HDD based at least in part on the mechanical tilt.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
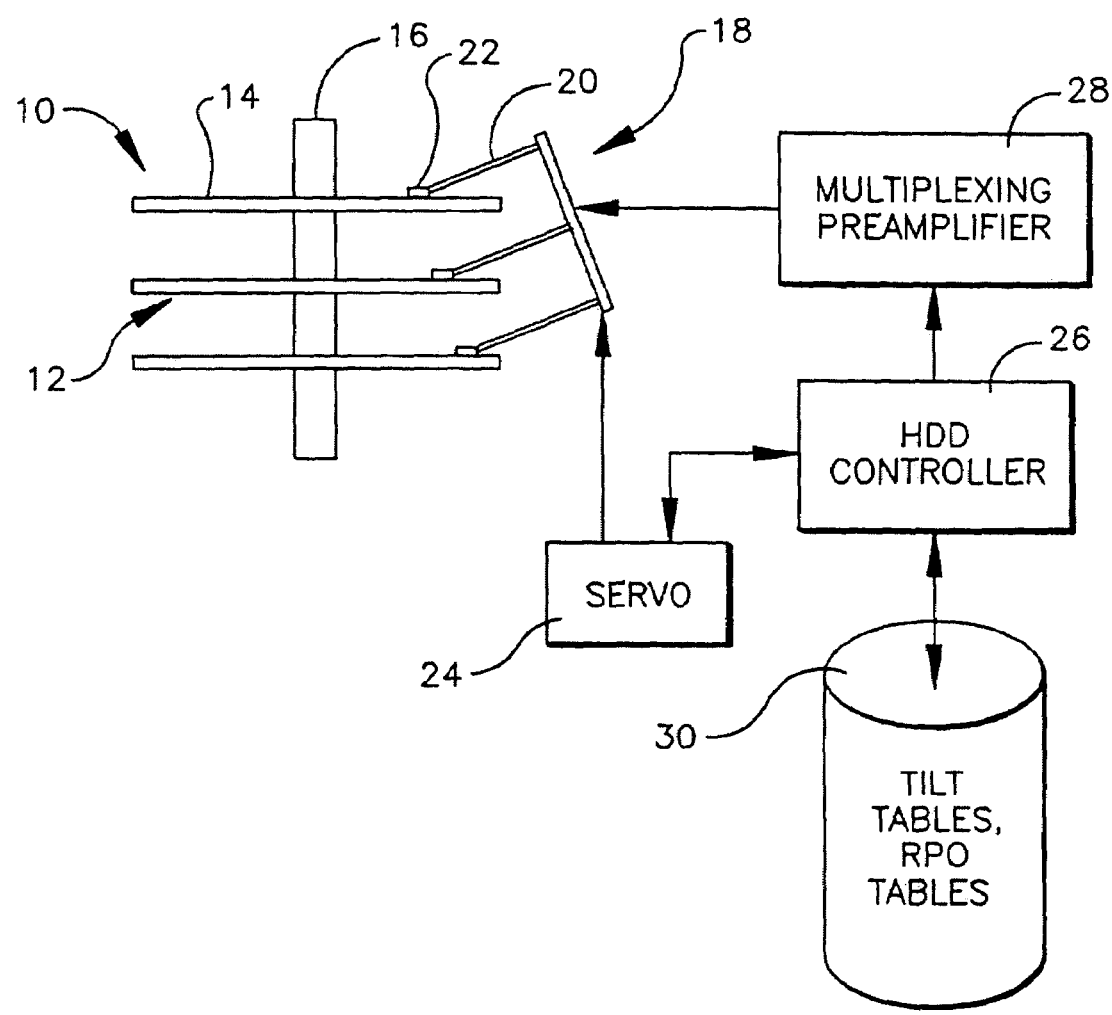
FIG. 1 is a schematic view of the hard disk drive, showing the disk stack and showing the head stack in exaggerated tilt with the disk stack.

Referring initially to FIG. 1, a data storage system is shown, generally designated 10, which includes a disk stack 12 having plural equidistantly spaced disks 14 supported on a spindle 16. While three disks 14 are shown the disk stack 12 may have greater or fewer disks. A head stack 18 includes plural parallel arms 20 on the ends of which are mounted respective read/write heads 22 for reading and writing data from the disks 14 over which the heads 22 are respectively positioned. FIG. 1 shows that the head stack 18 can be mechanically tilted with respect to the parallel planes of the disks 14, the problem to which the present invention is addressed.

The head stack 18 may be moved by a servo 24 that responds to commands from a hard disk drive (HDD) controller 26. The HDD controller 26 electrically communicates (is in electrical contact) with one head 22 at a time through a multiplexing preamplifier 28. In accordance with disclosure set forth below, the HDD controller 26 can access storage 30 to access one or more tables of values representative of mechanical tilt between the head stack 18 and disk stack 12. The storage 30 may also contain RPO tables (or, equivalently, RPO functions) that are used in accordance with means known in the art for determining expected access times of I/O requests in the queue of the HDD controller 28 to order the requests in a manner that optimizes performance. The particular RPO algorithms used are not integral to the present invention. The present invention applies to any command reordering algorithm that uses seek length in its calculation. The storage 30 may be implemented in memory of the HDD controller 26.

Figure 2:
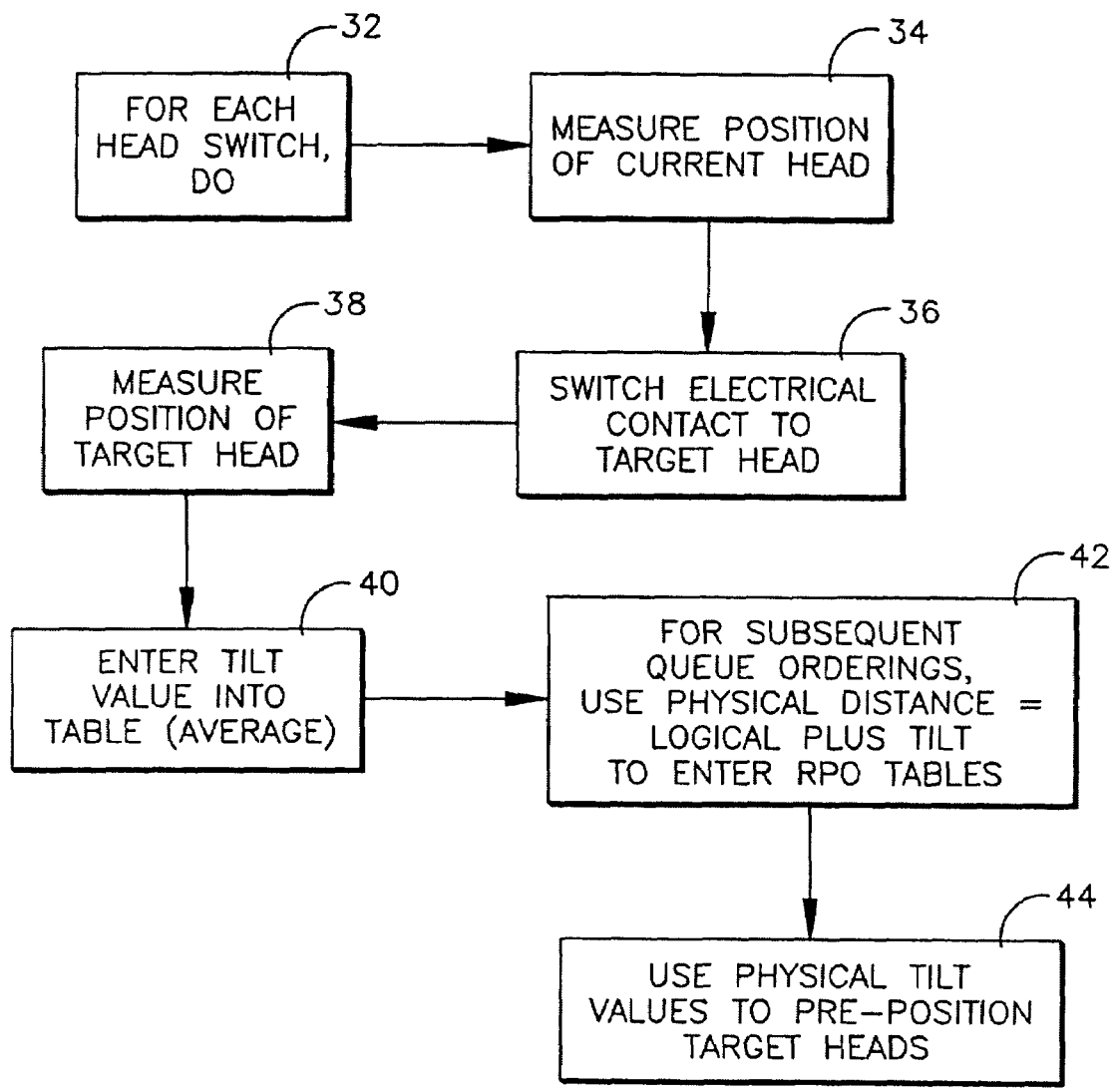
FIG. 2 is a flow chart of the present logic.

The logic of the present invention can be seen in reference to FIG. 2. At block 32, when a head switch is about to occur, i.e., when the HDD controller 26, in electrical contact with a current head 22, determines that it must make electrical contact with a target head 22 associated with another disk in the disk stack 12, the servo 24 measures, at block 34, the actual position of the current head relative to its respective disk just prior to terminating electrical connection therewith. The position may be measured in accordance with means known in the art, e.g., by noting which zone, cylinder, and sector the current head is over using, e.g., the servo pattern on the disk.

At block 36 electrical contact is switched to the target head. Then, at block 38, the position of the target head is measured by the servo 24. The difference between the current head position and target head position is representative of the mechanical tilt between the current and target heads. Specifically, if the current head is determined to be above track 95, under no tilt conditions the target head will also be above track 95, but in the presence of tilt the target head will be above another track, e.g., track 98. It is to be understood that the well-known MR offset of the read element from the write element on the head, primarily due to the skew effect of a rotary actuator, preferably is taken into account by adding or subtracting the offset as appropriate when determining the tilt.

At block 40 the tilt information is stored, for example in a table of tilt values that might have as many columns and rows as there are heads. In the preferred embodiment, because tilt can change over time a running average is kept of the tilt, with the latest value being averaged against the other values present for that entry.

The tilt table may be constructed in any number of ways. For example, respective tilt values between respective pairs of heads can be maintained. Or, all tilt values can be referenced to a reference head. The actual tilt between two heads can be extended by interpolation to tilt values for other head pairs. This can mean updating all tilt values each time a head switch is done, with the actual tilt value being correlated to the particular head pair in the switch and all other values being updated through interpolation.

At block 42 for subsequent I/O request orderings in the queue of the HDD controller 26, instead of using the logical seek distance, a physical seek distance is calculated and used in the request ordering algorithm. The physical seek distance can be related to the sum of the logical seek distance as conventionally determined (using, e.g., zone-cylinder-head-sector conversion techniques) plus, when a head switch is required, the tilt distance value (which can be negative, depending on the direction of tilt). Then, in implementations using RPO tables for instance, the physical seek distance is used to choose the appropriate values from the RPO tables when calculating the EAT (Estimated Access Time).

In addition to the above, at block 44 the values in the tilt table are used to determine which direction and how far the servo must move the actuator when a head switch is involved in a new seek command. This foreknowledge of the actual seek direction and magnitude in the presence of tilt allows the servo to start moving the actuator even before electrical connection is made to the target head, reducing overhead time thus improving performance, particularly for small partitions or very high queue-depths where there are many short seeks. The physical seek distance is also used instead of the logical seek distance to appropriately update the RPO tables (or functions, as appropriate) during their learning process in accordance with RPO table learning principles known in the art. With more specificity, the tables preferably are updated as follows: the "new" tilt value used in determining the physical seek length is calculated by determining the difference between the position of the current head just prior to switching electrical connection and the position of the target head just after switching electrical connection to the target head, plus (or minus, as appropriate) any actuator pre-move that was executed at block 44. The amount of actuator pre-move can be determined in accordance with servo principles well known in the art using the current that was supplied to the servo during the pre-move and the known moment of inertia of the actuator and torque constant of the voice coil motor (VCM).

While the particular SYSTEM AND METHOD FOR CORRECTING FOR HEAD TILT IN HDD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A method for controlling a disk drive having a disk stack and a head stack, comprising:

ordering requests in a queue of the disk drive based at least in part on a mechanical tilt between the disk stack and head stack.

2. The method of claim 1, further comprising moving a target head toward a position on a disk before electrical contact is made with the target head at least in part based on the mechanical tilt.

3. The method of claim 1, wherein the mechanical tilt is determined by:
   measuring a position of a current head in electrical contact with a drive controller just prior to an electrical connection of a target head with the controller; and
   measuring a position of the target head, a value representative of the mechanical tilt being based on the difference in position of the target head and the position of the current head.

4. The method of claim 1, wherein RPO tables are entered at least in part based on the mechanical tilt to order the requests.

5. The method of claim 1, wherein values representing the mechanical tilt are stored in a table.

6. The method of claim 5, wherein the values represent rolling averages of the tilt.

7. A method for controlling a disk drive having a disk stack and a head stack, comprising:
   moving a target head toward a position on a disk before electrical contact is made with the target head at least in part based on a mechanical tilt between the disk stack and head stack.

8. The method of claim 7, further comprising ordering requests in a queue of the disk drive based at least in part on the mechanical tilt.

9. The method of claim 7, wherein the mechanical tilt is determined by:
   measuring a position of a current head in electrical contact with a drive controller just prior to an electrical connection of a target head with the controller; and
   measuring a position of the target head, a value representative of the mechanical tilt being based on the difference in position of the target head and the position of the current head.

10. The method of claim 7, wherein RPO tables are entered at least in part based on the mechanical tilt to order the requests.

11. The method of claim 7, wherein values representing the mechanical tilt are stored in a table.

12. The method of claim 11, wherein the values represent rolling averages of the tilt.

13. A method for accounting for mechanical tilt between a head stack and a disk stack in a hard disk drive (HDD) including a HDD controller, comprising:
   moving a target head toward a position on a disk before electrical contact is made with the target head at least in part based on a mechanical tilt between the disk stack and head stack; and
   ordering requests in a queue of the HDD based at least in part on the mechanical tilt.

14. The method of claim 13, wherein the mechanical tilt is determined by:
   measuring a position of a current head in electrical contact with the HDD controller just prior to an electrical connection of the target head with the controller; and
   measuring a position of the target head, a value representative of the mechanical tilt being based on the difference in position of the target head and the position of the current head.

15. The method of claim 13, wherein RPO tables are entered at least in part based on the mechanical tilt to order the requests.

16. The method of claim 13, wherein values representing the mechanical tilt are stored in a table.

17. The method of claim 16, wherein the values represent rolling averages of the tilt.

* * * * *